United States Patent
Nielsen

(10) Patent No.: US 7,690,196 B2
(45) Date of Patent: Apr. 6, 2010

(54) HYDRAULIC ACTUATOR HAVING AN AUXILIARY VALVE

(75) Inventor: Brian Nielsen, Viborg (DK)

(73) Assignee: Sauer-Danfoss ApS, Nordborg (DK)

( * ) Notice: Subject to any disclaimer, the term of this patent is extended or adjusted under 35 U.S.C. 154(b) by 299 days.

(21) Appl. No.: 11/703,431

(22) Filed: Feb. 7, 2007

(65) Prior Publication Data

US 2008/0184876 A1     Aug. 7, 2008

(51) Int. Cl.
*F16D 31/02* (2006.01)
(52) U.S. Cl. .............................. 60/444; 91/506; 91/454
(58) Field of Classification Search ................... 91/454, 91/506; 60/443, 444
See application file for complete search history.

(56) References Cited

U.S. PATENT DOCUMENTS

| | | | |
|---|---|---|---|
| 2,569,881 A | 10/1951 | Davies | |
| 3,559,536 A | 2/1971 | Mason | |
| 4,282,711 A | 8/1981 | Branstetter | |
| 4,416,187 A | 11/1983 | Nystrom | 91/361 |
| 4,640,095 A * | 2/1987 | Engel et al. | 60/443 |
| 4,870,892 A | 10/1989 | Thomsen et al. | 91/361 |
| 5,165,320 A | 11/1992 | Ravn | |
| 5,202,822 A | 4/1993 | McLaughlin et al. | |
| 5,299,420 A | 4/1994 | Devier et al. | |
| 5,353,685 A | 10/1994 | Snow | |
| 5,489,005 A | 2/1996 | Marcott et al. | |
| 5,519,636 A | 5/1996 | Stoll et al. | |
| 5,743,165 A | 4/1998 | Tanaka et al. | |
| 5,868,059 A | 2/1999 | Smith | |
| 5,960,695 A | 10/1999 | Aardema et al. | |
| 6,131,391 A | 10/2000 | Poorman | |
| 6,626,082 B2 | 9/2003 | Morita et al. | |
| 6,637,199 B2 | 10/2003 | Spickard | |
| 6,662,556 B2 | 12/2003 | Bares et al. | |
| 6,748,738 B2 * | 6/2004 | Smith | 91/454 |
| 7,380,398 B2 * | 6/2008 | Pfaff | 91/454 |
| 2004/0196003 A1 | 10/2004 | Graff et al. | |
| 2006/0136101 A1 | 6/2006 | Spengler | |

FOREIGN PATENT DOCUMENTS

| | | |
|---|---|---|
| DE | 92 11 109.2 U1 | 10/1992 |
| DE | 4312757 A1 | 10/1994 |

(Continued)

*Primary Examiner*—F. Daniel Lopez
(74) *Attorney, Agent, or Firm*—McCormick, Paulding & Huber LLP

(57) ABSTRACT

A hydraulic actuator for a hydraulic servomotor 4 is disclosed. The hydraulic servomotor 4 has a first chamber 5 and a second chamber 6 associated therewith. The hydraulic actuator is connected to a fluid source 2 and a fluid drain 3, and it comprises a valve assembly arranged between the fluid source 2 and the fluid drain 3 to control fluid pressures in the chambers 5, 6. At least one auxiliary valve 11 is fluidly connected between the valve assembly and the fluid drain 3, said auxiliary valve(s) 11 being of a kind which is normally closed in a de-energized state. In the case of a power cut off the auxiliary valve(s) 11 will close, thereby preventing fluid flow from the valve assembly towards the fluid drain 3. This causes a servomotor piston member 12 to be hydraulically locked in its instantaneous position, thereby locking the hydraulic servomotor 4. The valve assembly may be designed without taking the locking function into consideration.

8 Claims, 5 Drawing Sheets

FOREIGN PATENT DOCUMENTS

| | | |
|---|---|---|
| DE | 102005013823 A1 | 11/2005 |
| EP | 1 403 129 A2 | 3/2004 |
| EP | 1700728 A2 | 9/2006 |
| WO | 96/07029 A1 | 3/1996 |
| WO | 2005077731 A1 | 8/2005 |
| WO | 2005078318 A1 | 8/2005 |
| WO | 2006/102906 A2 | 10/2006 |

* cited by examiner

HYDRAULIC ACTUATOR HAVING AN AUXILIARY VALVE

CROSS REFERENCE TO RELATED APPLICATIONS

This application discloses similar subject matter as disclosed in co-pending application Ser. No. 11/703,575 entitled "A Control System For A Hydraulic Servomotor"; co-pending application Ser. No. 11/703,430 entitled "A Valve Assembly and A Hydraulic Actuator Comprising the Valve Assembly"; and co-pending application Ser. No. 11/703,314 entitled "A Hydraulic Actuator For A Servomotor With an End Lock Function" all assigned to the same Assignee and filed on the same date herewith.

FIELD OF THE INVENTION

The present invention relates to a hydraulic actuator for a hydraulic servomotor, the hydraulic actuator comprising a valve assembly for controlling fluid pressure in chambers defined by the hydraulic servomotor. In the hydraulic actuator according to the invention it is possible to instantaneously lock the hydraulic servomotor in the case that electrical power is lost or a failure is detected.

BACKGROUND OF THE INVENTION

Some prior art hydraulic actuators, such as the actuators disclosed in WO 96/07029 or U.S. Pat. No. 4,870,892 provide safety measures in the case of electrical power cut off or actuator failure. In the actuators disclosed in WO 96/07029 and U.S. Pat. No. 4,870,892 this is obtained by causing a sliding member to move to a neutral position in the case of power cut off or actuator failure. In the actuator disclosed in U.S. Pat. No. 4,870,892 this is obtained by positioning the sliding member in the diagonal of a bridge circuit. Two valves which are normally closed in a de-energized state are fluidly connected between a pump and two pressure chambers of the sliding member, and two valves which are normally open in a de-energized state are fluidly connected between the pressure chambers and a tank. Furthermore, two biasing springs are arranged in the sliding member, biasing the sliding member towards the neutral position. Thus, in the case of an electrical power cut off the two valves arranged on the pump side are closed and the two valves on the tank side are opened. In the absence of fluid pressure from the pump, due to the closed valves on the pump side, the biasing springs will push the sliding member towards the neutral position, and fluid is allowed to flow between the tank and the pressure chambers, due to the open valves on the tank side. Accordingly, the sliding member is moved into the neutral position.

In the actuator disclosed in WO 96/07029 a sliding member is also positioned in the diagonal of a bridge circuit. However, in this case all four valves are of the normally open type. Thus, in the case of a power cut off, all four valves are opened. Thereby there is a permanent flow of fluid from the pressure source (pump) to the pressure sink (tank). Since this flow of fluid is distributed uniformly over the two branches of the bridge circuit, the pressure on each side of the sliding member is the same. Thereby the sliding member will be moved to a neutral position.

However, in some hydraulic position motors, such as those incorporated in hydro-mechanical transmissions (HMT's) on all terrain vehicles or work utility vehicles, there is a need for locking a hydraulic servomotor in its instantaneous position, if a failure is detected or loss of power happens. For example, the driver must, for safety reasons, not be exerted to potential hazardous accelerations, and the gearing ratio of the HMT must therefore be maintained in the case of a power loss or actuator failure. With regard to the hydraulic servomotor, this means that it should be locked in its instantaneous position. In such applications it is therefore not necessarily appropriate that the hydraulic servomotor must move to a neutral position as described in WO 96/07029 and U.S. Pat. No. 4,870,892.

U.S. Pat. No. 4,416,187 discloses a servosystem having solenoid activated on-off valves governing the amount of fluid in two variable volume chambers of a double acting piston-cylinder unit. The servosystem may comprise a valve arrangement in which a check valve and a restriction are arranged between a pump and the first variable volume chamber, another check valve and a restriction are arranged between the pump and the second variable volume chamber, a solenoid valve which is normally closed in a de-energized state is arranged between the first variable volume chamber and a fluid drain, and another solenoid valve which is normally closed in a de-energized state is arranged between the second variable volume chamber and the fluid drain. The check valves are positioned in such a manner that a flow of fluid is allowed in a direction from the pump towards the fluid chambers. In the case of a power cut off the two valves arranged between the variable volume chambers and the fluid drain will be closed, and thereby fluid flow out of the variable volume chambers is prevented. As a consequence, the piston is not able to move in the cylinder, and the servosystem is therefore locked in its instantaneous position. However, in the servosystem of U.S. Pat. No. 4,416,187 the locking feature is only obtained if the valves arranged between the variable volume chambers and the fluid drain are both of the kind which is normally closed in a de-energized state. This limits the possibilities of designing the bridge circuit while taking other factors into consideration, and it may thereby not be possible to design the bridge circuit in a manner which optimizes the performance of the servosystem during normal operation.

SUMMARY OF THE INVENTION

It is, thus, an object of the invention to provide a hydraulic actuator for a hydraulic servomotor in which the hydraulic servomotor is locked in its instantaneous position in the case of power loss or actuator failure.

It is a further object of the invention to provide a hydraulic actuator for a hydraulic servomotor, the hydraulic actuator providing improved safety for an operator as compared to similar prior art hydraulic actuators.

It is an even further object of the invention to provide a hydraulic actuator for a hydraulic servomotor, the hydraulic actuator providing improved safety while maintaining a high degree of freedom with respect to design of the hydraulic actuator.

It is an even further object of the invention to provide a hydraulic actuator for a hydraulic servomotor, the hydraulic actuator being able to operate the hydraulic servomotor in an optimal manner, while providing a safety feature in case of power cut off or actuator failure.

According to the invention the above and other objects are fulfilled by providing a hydraulic actuator for a hydraulic servomotor having a first chamber and a second chamber, the actuator being connected to a fluid source and a fluid drain, the actuator comprising:

a valve assembly arranged between the fluid source and the fluid drain, the valve assembly further being arranged to control fluid pressures in the first chamber and the second chamber, and at least one auxiliary valve fluidly connected between the valve assembly and the fluid drain, said at least one auxiliary valve being of a kind which is normally closed in a de-energized state.

In the present context the term 'hydraulic actuator' should be interpreted to mean an actuator which is adapted to drive a hydraulic application, in this case a hydraulic servomotor.

The fluid source may advantageously be or comprise a pump, and the fluid drain may advantageously be or comprise a tank.

The hydraulic servomotor may be of a linear kind, e.g. comprising a sliding member with a piston slidingly arranged in a cylinder, the piston dividing the cylinder into the first and second chambers. As an alternative, the hydraulic servomotor may be of a rotational kind comprising one or more angularly movable members being displaceable in response to a supply of fluid to the first and second chambers. As another alternative, it may be of a kind comprising two linearly moving pistons, e.g. with a pressure chamber at one end of each piston and attached to a swash plate rotating about a trunnion.

The auxiliary valve(s) is/are of a kind which is normally closed in a de-energized state. Accordingly, in the case of a power cut off, the auxiliary valve(s) will close, and since the auxiliary valve(s) is/are fluidly connected between the valve assembly and the fluid drain, a flow of fluid from the valve assembly towards the fluid drain is thereby instantaneously prevented. As a consequence, the hydraulic servomotor will be immediately locked in its instantaneous position. In the case that an actuator failure is detected, the auxiliary valve(s) may be actively de-energized, thereby obtaining the situation described above.

It should be noted that in the present context the term 'locked' should be interpreted to mean hydraulically locked or held, rather than mechanically locked.

Thus, the auxiliary valve(s) provide(s) a safety function in the case of a power cut off or actuator failure, i.e. it/they provide(s) another function than operating the hydraulic actuator, i.e. an auxiliary function. Hence the term 'auxiliary valve'.

It is an advantage that at least one auxiliary valve is fluidly connected between the valve assembly and the fluid drain, and thereby does not form part of the valve assembly, because this allows the valve assembly to be designed without taking other perspectives, e.g. safety perspectives, into account. Since the at least one auxiliary valve does not form part of the valve assembly, the normal operation of the hydraulic servomotor will not be affected by the nature of the auxiliary valve, and the valves of the valve assembly may be chosen in any suitable manner, e.g. taking optimum operation of the hydraulic servomotor into account. Thus, this opens the possibility of designing the valve assembly in accordance with any desired design parameter, while maintaining a safety feature in the case of a power cut off or actuator failure.

The at least one auxiliary valve may be an electrically operable valve, such as a solenoid valve. Alternatively, it may be any other suitable kind of valve which is closed in a de-energized state, and which may be operated to an open state.

One or more of the valves of the valve assembly may also be an electrically operable valve, such as a solenoid valve.

The valve assembly may comprise at least four valves arranged in a bridge circuit with the hydraulic servomotor arranged in a diagonal of the bridge circuit. In this case the valve assembly may comprise:

at least one first valve fluidly connected between the fluid source and the first chamber, at least one second valve fluidly connected between the fluid source and the second chamber, at least one third valve fluidly connected between the first chamber and the at least one auxiliary valve, and at least one fourth valve fluidly connected between the second chamber and the at least one auxiliary valve.

As an alternative, the valve assembly may have any other suitable configuration, as long as the valves of the valve assembly are arranged in such a manner, relatively to each other, to the fluid source and to the fluid drain, that controlling the valves between their open and closed states results in fluid flows to and from the chambers being controlled, thereby controlling the hydraulic servomotor.

The at least one auxiliary valve may be kept open during normal operation. According to this embodiment, the at least one auxiliary valve is permanently energized, and thereby kept open, during normal operation. Accordingly, the presence of the at least one auxiliary valve has no effect on the normal operation of the hydraulic actuator, and the safety feature has thereby been provided without adversely affecting the normal functionality of the hydraulic actuator.

At least one valve of the valve assembly may be driven by a pulse train signal. All of the valves may be driven by one or more pulse train signals, or some of the valves may be driven by one or more pulse train signals, while other valves are not. Alternatively, all of the valves may be driven in any other suitable manner.

The valves of the valve assembly may be controlled by means of a closed loop control of the hydraulic servomotor. The closed loop control may, e.g., be, based on position of the servomotor, e.g. linear position or angular position, pressure in the chambers and/or on any other suitable parameter.

Thus, the hydraulic actuator may further comprise at least one sensor, said sensor(s) being adapted to provide an input signal to the closed loop control. Suitable sensors may, e.g., be position sensors, such as linear variable displacement transducers (LVDT), pressure sensors, temperature sensors, flow sensors, etc.

The hydraulic actuator according to the present invention may suitably be used in a hydro-mechanical transmission (HMT), e.g. for an all terrain vehicle or a work utility vehicle, or in an electro hydraulic steering application or any other suitable application.

The hydraulic actuator may comprise a main control module adapted to supply control signals to at least some of the valves, thereby controlling fluid flows in the actuator. The main control module may comprise one or more connectors, e.g. comprising connector pins, for receiving and/or transmitting signals, such as control signals, sensor signals, electric signals, optic signals, magnetic signals, etc. The actuator may further comprise or be connected to at least one extension control module comprising one or more connectors for receiving and/or transmitting signals. In this case the main control module and the extension control module(s) are preferably adapted to communicate signals to/from each other. Thereby it is possible to provide additional connectors for communicating signals to/from the actuator. Thereby it is possible to provide additional connectors for communicating with the main control module, and it may thereby be possible to allow for additional functionalities of the control module. Accordingly, a more 'intelligent' control system for the actuator can be provided, and the need for an external controller may even be avoided.

BRIEF DESCRIPTION OF THE DRAWINGS

The invention will now be described in further detail with reference to the accompanying drawings in which.

DETAILED DESCRIPTION OF THE INVENTION

Figure 1:
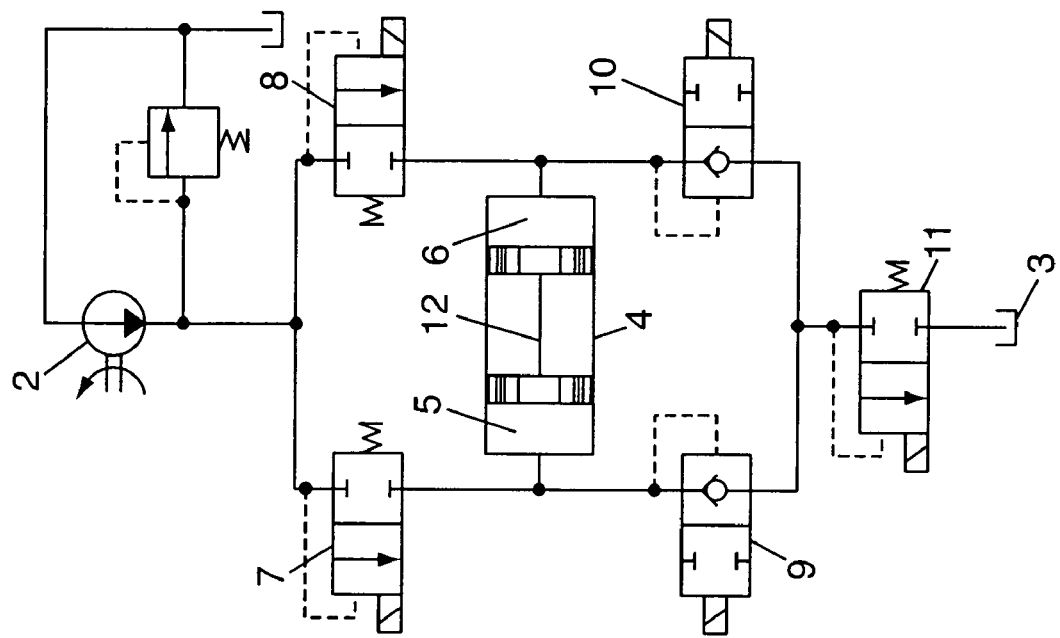

FIG. 1 is a schematic diagram illustrating a hydraulic actuator according to a first embodiment of the invention. The hydraulic actuator comprises a valve assembly connected between a fluid source in the form of a pump 2 and a fluid drain in the form of a tank 3, and it is further connected to a servomotor 4, the servomotor 4 defining a first chamber 5 and a second chamber 6. A first valve 7 is fluidly connected between the pump 2 and the first chamber 5. The first valve 7 is a solenoid valve which is closed in a de-energized state and open in an energized state. A second valve 8 is fluidly connected between the pump 2 and the second chamber 6. The second valve 8 is also a solenoid valve which is closed in a de-energized state and open in an energized state.

A third valve 9 is fluidly connected between the first chamber 5 and the tank 3. The third valve 9 is a solenoid valve which is closed in an energized state. In a de-energized state the third valve 9 functions as a check valve arranged in such a manner that a flow of fluid in a direction from the first chamber 5 towards the tank 3 is allowed, while a flow of fluid in a direction from the tank 3 towards the first chamber 5 is not allowed.

A fourth valve 10 is fluidly connected between the second chamber 6 and the tank 3. The fourth valve 10 is a solenoid valve which is closed in an energized state. In a de-energized state the fourth valve 10 functions as a check valve arranged in such a manner that a flow of fluid in a direction from the second chamber 6 towards the tank 3 is allowed, while a flow of fluid in a direction from the tank 3 towards the second chamber 6 is not allowed.

Thus, the valves 7, 8, 9, 10 form a bridge circuit with the servomotor 4 arranged in a diagonal of the bridge circuit.

The hydraulic actuator further comprises an auxiliary valve 11 fluidly connected between the bridge circuit formed by the valves 7, 8, 9, 10 and the tank 3. The auxiliary valve 11 is arranged in such a manner that the third valve 9 is fluidly connected between the first chamber 5 and the auxiliary valve 11, and the fourth valve 10 is fluidly connected between the second chamber 6 and the auxiliary valve 11. Thus, when the auxiliary valve 11 is closed, a flow of fluid from the first chamber 5 towards the tank 3 as well as a flow of fluid from the second chamber 6 towards the tank 3 will be prevented.

During normal operation of the hydraulic actuator the auxiliary valve 11 is kept in an open state. Accordingly, the auxiliary valve 11 has no effect on the normal operation of the hydraulic actuator, and thereby of the servomotor 4, under normal circumstances. Accordingly, the hydraulic actuator may be operated in an optimal manner, depending on the application and the relevant circumstances.

However, in the case of a power cut off the auxiliary valve 11 is immediately closed, thereby preventing fluid flows from the chambers 5, 6 towards the tank 3 as described above. Furthermore, the first valve 7 and the second valve 8 will both be closed, thereby preventing a flow of fluid from the first chamber 5 towards the pump 2 and a flow of fluid from the second chamber 6 towards the pump 2, respectively. Thus, in this situation, it is not possible for fluid in the chambers 5, 6 to leave the chambers 5, 6, and servomotor piston member 12 is therefore locked in its instantaneous position.

Figure 2:
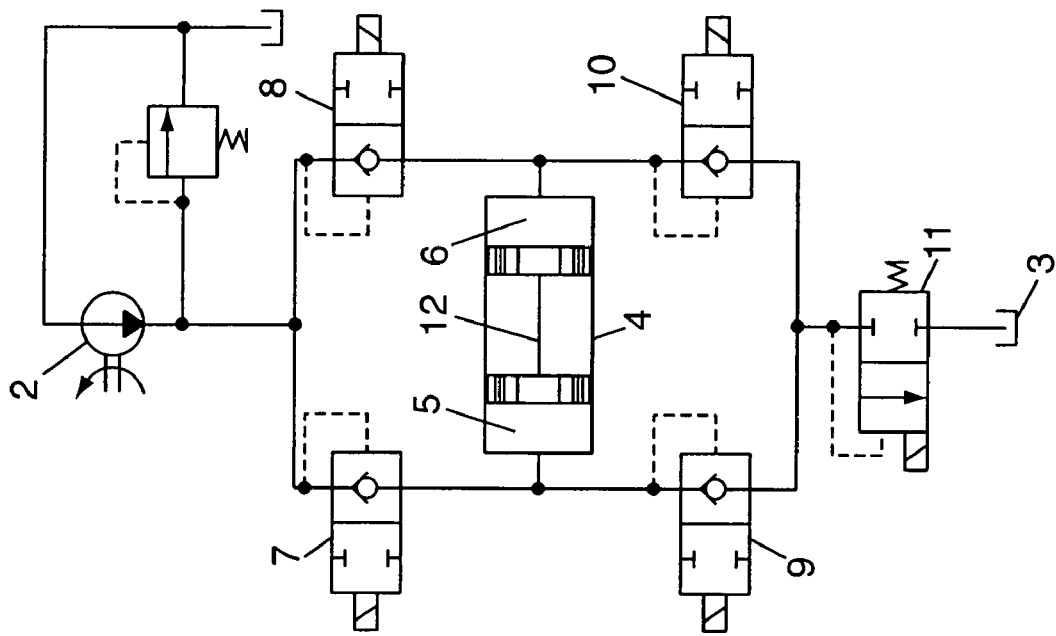
FIGS. 1-6 are schematic diagrams illustrating various embodiments of hydraulic actuators according to the invention.

FIG. 2 is a schematic diagram of a hydraulic actuator according to a second embodiment of the invention. The embodiment shown in FIG. 2 is very similar to the embodiment shown in FIG. 1, and parts which have already been described above will therefore not be described in detail here.

In the embodiment of FIG. 2 the first valve 7 and the second valve 8 are both solenoid valves of the kind which is closed in an energized state. In a de-energized state the first valve 7 functions as a check valve arranged in such a manner that a flow of fluid in a direction from the pump 2 towards the first chamber 5 is allowed, while a flow of fluid in a direction from the first chamber 5 towards the pump 2 is not allowed. Similarly, in a de-energized state the second valve 8 functions as a check valve arranged in such a manner that a flow of fluid in a direction from the pump 2 towards the second chamber 6 is allowed, while a flow of fluid in a direction from the second chamber 6 towards the pump 2 is not allowed.

Accordingly, in the case of a power cut off, a flow of fluid out of the chambers 5, 6 will be prevented as described above, and the hydraulic actuator of FIG. 2 will function exactly as the hydraulic actuator of FIG. 1 under these circumstances.

Figure 3:
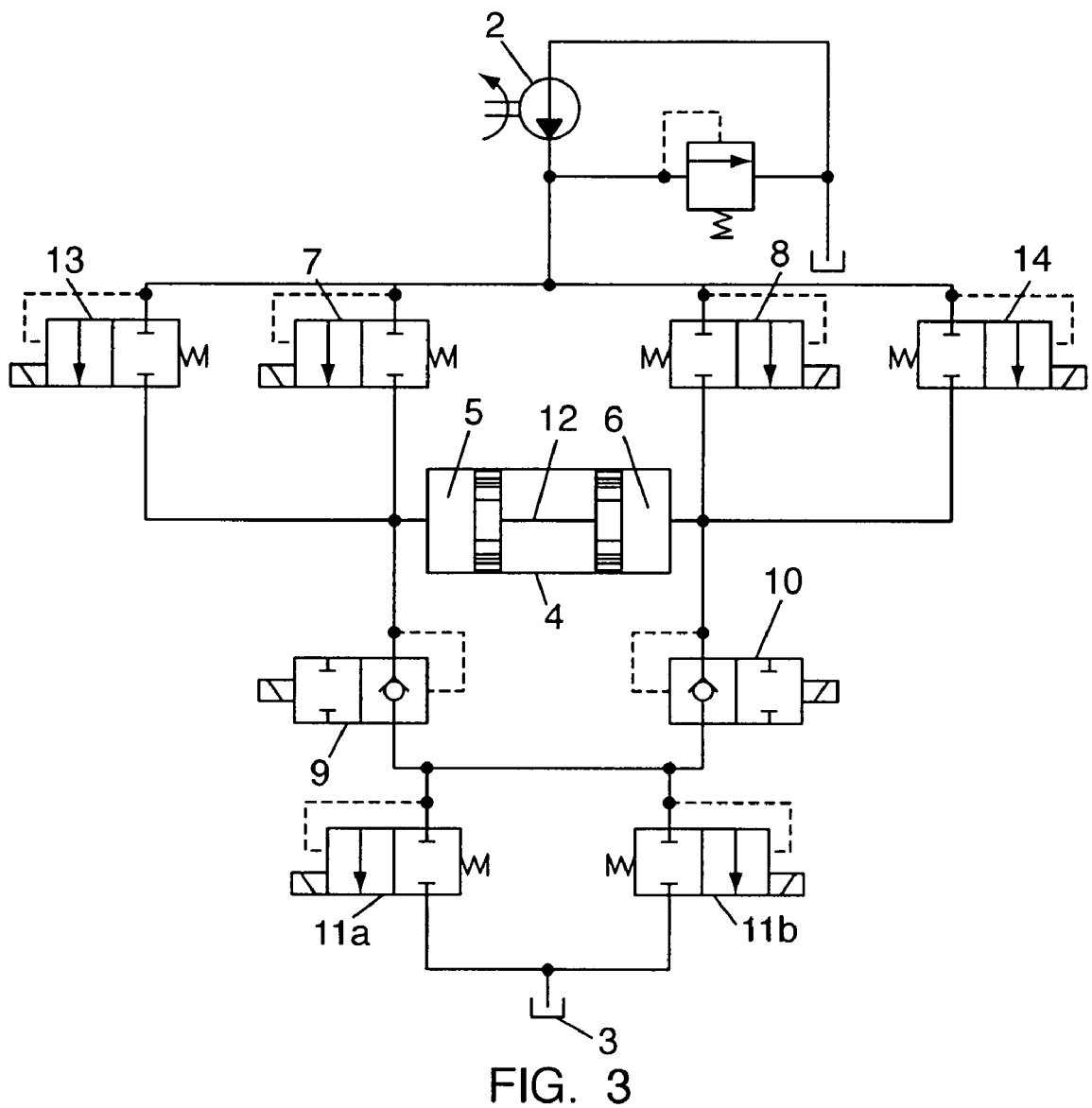

FIG. 3 is a schematic diagram of a hydraulic actuator according to a third embodiment of the invention. The embodiment shown in FIG. 3 is very similar to the embodiment shown in FIG. 1, and parts which have already been described above will therefore not be described in detail here.

The hydraulic actuator of FIG. 3 comprises two auxiliary valves 11a, 11b, a first auxiliary valve 11a being fluidly connected between the third valve 9 and the tank 3, and a second auxiliary valve 11b being fluidly connected between the fourth valve 10 and the tank 3. Furthermore the third valve 9 and the fourth valve 10 are fluidly connected. Both auxiliary valves 11a, 11b are of the kind which is closed in a de-energized state, i.e. in the case of a power cut off both of the auxiliary valves 11a, 11b will be closed, thereby preventing a flow of fluid from the first chamber 5 towards the tank 3, as well as a flow of fluid from the second chamber 6 towards the tank 3. Thus, the safety feature described above is also obtained in the hydraulic actuator of FIG. 3.

During normal operation of the hydraulic actuator the auxiliary valves 11a, 11b will be kept open, thereby allowing flows of fluid from the chambers 5, 6 towards the tank 3. Since there are two flow paths from the chambers 5, 6 towards the tank 3, i.e. via the first auxiliary valve 11a and via the second auxiliary valve 11b, respectively, larger flows will be allowed during normal operation than is the case in the hydraulic actuators shown in FIGS. 1 and 2.

The hydraulic actuator of FIG. 3 further comprises a fifth valve 13 fluidly connected between the pump 2 and the first chamber 5, and in parallel with the first valve 7. The fifth valve 13 is a solenoid valve of the kind which is closed in a de-energized state and open in an energized state. Furthermore, a sixth valve 14 is fluidly connected between the pump 2 and the second chamber 6, and in parallel with the second valve 8. The sixth valve 14 is also a solenoid valve of the kind which is closed in a de-energized state and open in an energized state. The fifth valve 13 and the sixth valve 14 provide further possibilities of controlling fluid flows to and from the chambers 5, 6. In particular, a larger flow capacity may be obtained through the first valve 7 and the fifth valve 13 if the first valve 7 as well as the fifth valve 13 was opened. Similarly, a larger flow capacity may be obtained through the second valve 8 and the sixth valve 14 if the second valve 8 as well as the sixth valve 14 was opened.

Figure 4:
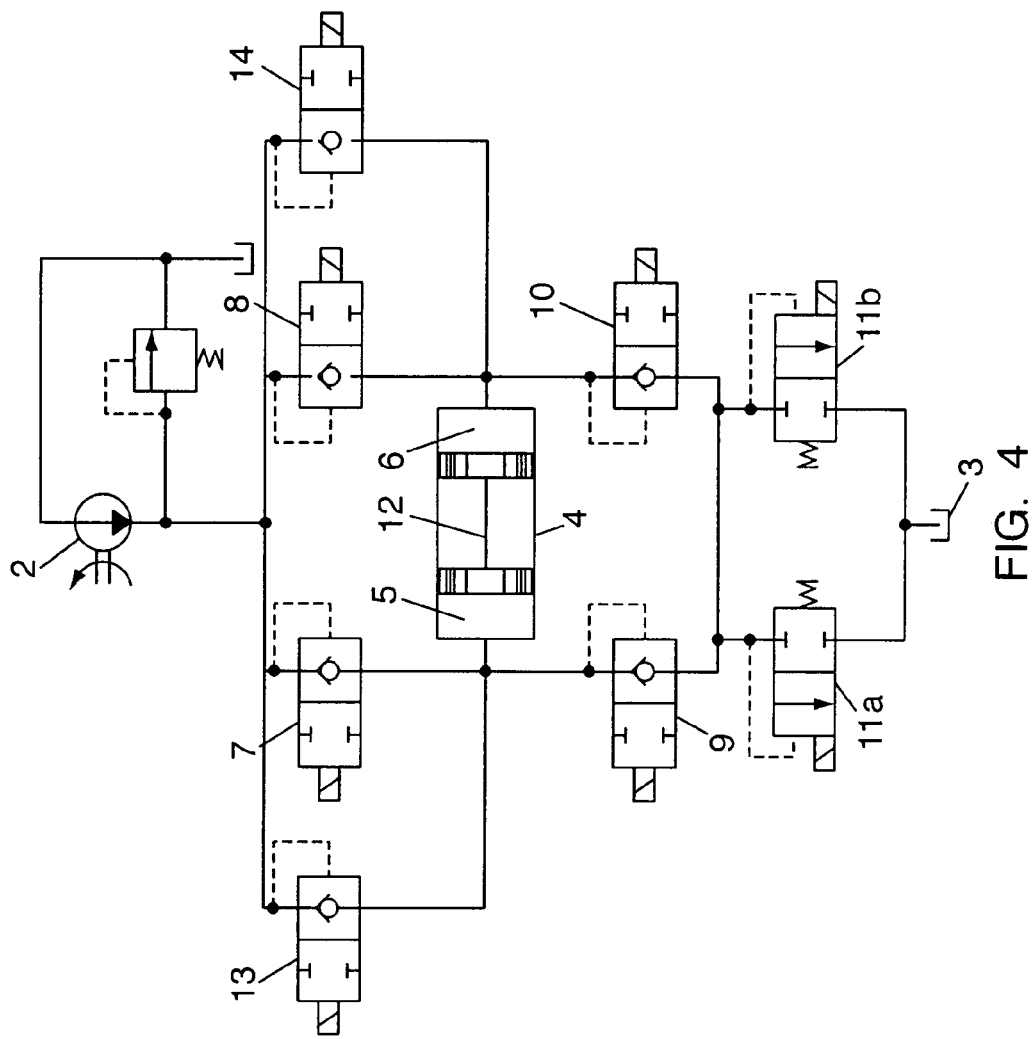

FIG. 4 is a schematic diagram of a hydraulic actuator according to a fourth embodiment of the invention. The embodiment shown in FIG. 4 is very similar to the embodiment shown in FIG. 3, and parts which have already been described above will therefore not be described in detail here.

In the hydraulic actuator shown in FIG. 4 the first valve 7, the second valve 8, the fifth valve 13 and the sixth valve 14 are all solenoid valves of the kind which is closed in an energized state.

In a de-energized state the first valve 7 and the fifth valve 13 function as check valves arranged in such a manner that a flow of fluid in a direction from the pump 2 towards the first chamber 5 is allowed, while a flow of fluid in a direction from the first chamber 5 towards the pump 2 is not allowed. Similarly, in a de-energized state the second valve 8 and the sixth valve 14 function as check valves arranged in such a manner that a flow of fluid in a direction from the pump 2 towards the second chamber 6 is allowed, while a flow of fluid in a direction from the second chamber 6 towards the pump 2 is not allowed.

Accordingly, in the case of a power cut off, a flow of fluid out of the chambers 5, 6 will be prevented as described above with reference to FIG. 3, and the hydraulic actuator of FIG. 4 will function exactly as the hydraulic actuator of FIG. 3 under these circumstances.

Figure 5:
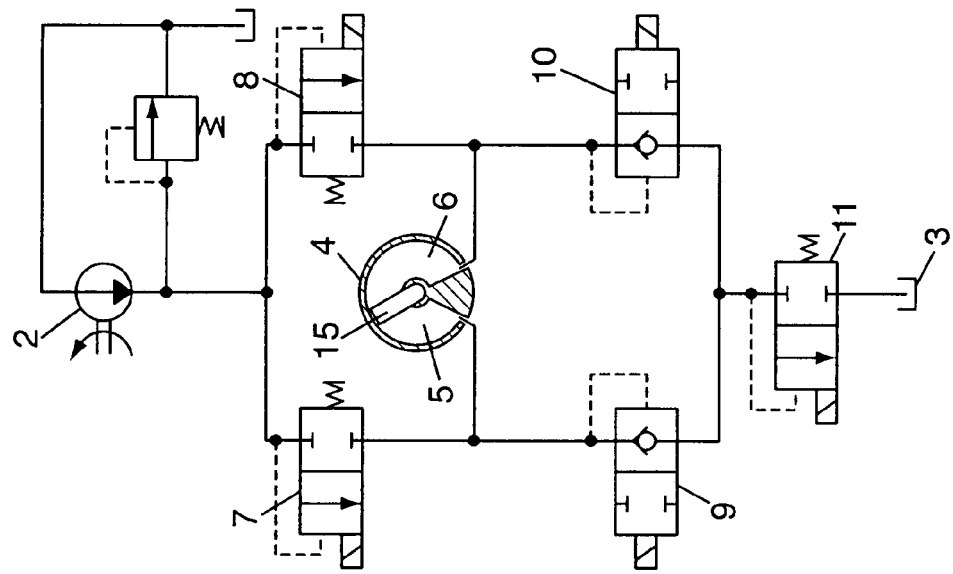

FIG. 5 is a schematic diagram of a hydraulic actuator according to a fifth embodiment of the invention. The hydraulic actuator of FIG. 5 is very similar to the hydraulic actuator of FIG. 1, and parts which have already been described above will therefore not be described in detail here.

The difference between the hydraulic actuator of FIG. 1 and the hydraulic actuator of FIG. 5 is that the servomotor 4 shown in FIG. 5 is of a rotatable kind. The servomotor 4 comprises a first chamber 5 and a second chamber 6, the chambers 5, 6 being fluidly connected to the valves 7, 8, 9, 10 as described above. However, in this case the chambers 5, 6 are divided by a rotating member 15. Thus, opening and closing the valves 7, 8, 9, 10 in an appropriate manner will, in this case, result in a desired fluid flow to/from the chambers 5, 6, and thereby a desired angular position of the rotating member 15 is obtained.

In the case of a power cut off, the auxiliary valve 11 is immediately closed, thereby preventing fluid flows from the chambers 5, 6 towards the tank 3 as described above. Furthermore, the first valve 7 and the second valve 8 will both be closed, thereby preventing fluid flows from the chambers 5, 6 towards the pump 2. Thereby fluid flow from both of the chambers 5, 6 is prevented, and the rotating member 15 is consequently instantaneously locked in its immediate angular position.

Figure 6:
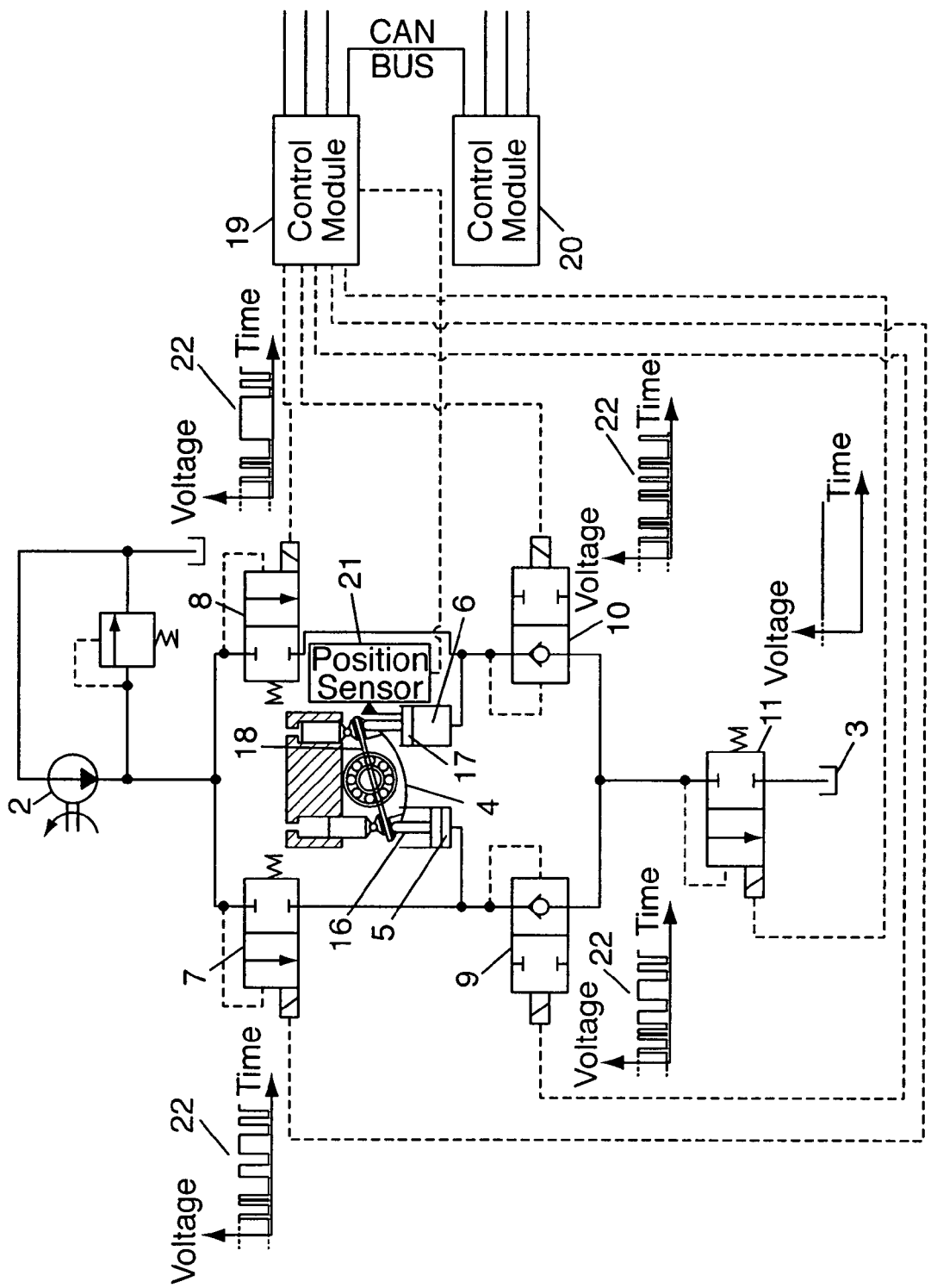

FIG. 6 is a schematic diagram of a hydraulic actuator according to a sixth embodiment of the invention. The hydraulic actuator of FIG. 6 is very similar to the hydraulic actuator of FIG. 1, and parts which have already been described above will therefore not be described in detail here.

The difference between the hydraulic actuator of FIG. 1 and the hydraulic actuator of FIG. 6 is that the servomotor 4 shown in FIG. 6 is of a kind having two linearly moving pistons 16, 17. Each of the linearly moving pistons 16, 17 has a chamber 5, 6, the chambers 5, 6 being fluidly connected to the valves 7, 8, 9, 10 as described above. The linearly moving pistons 16, 17 are attached to a swash plate 18 in such a manner that the angular position of the swash plate 18 is determined by the positions of the linearly moving pistons 16, 17. Thus, in this case, opening and closing the valves 7, 8, 9, 10 in an appropriate manner will result in a desired fluid flow to/from the chambers 5, 6. This will result in desired positions of the linearly moving pistons 16, 17, and thereby in a desired angular position of the swash plate 18.

In the case of a power cut off, the auxiliary valve 11 is immediately closed, thereby preventing fluid flows from the chambers 5, 6 towards the tank 3 as described above. Furthermore, the first valve 7 and the second valve 8 will both be closed, thereby preventing fluid flows from the chambers 5, 6 towards the pump 2. Thereby fluid flow from both of the chambers 5, 6 is prevented, and the swash plate 18 is consequently instantaneously locked in its immediate angular position.

FIG. 6 further illustrates how a main control module 19 and an extension control module 20 are connected to the servomotor 4. The hydraulic actuator comprises a sensor 21 measuring the position of one of the linearly moving pistons 17, and thereby the position of the swash plate 18. The measured position is supplied to the main control module 19, and based on this, the main control module 19 controls the valves 7, 8, 9, 10 by means of pulse train signals 22 supplied to each of the valves 7, 8, 9, 10. Thus, the valves 7, 8, 9, 10 shown in FIG. 6 are controlled by means of a closed loop control of the servomotor 4.

Figure 7:
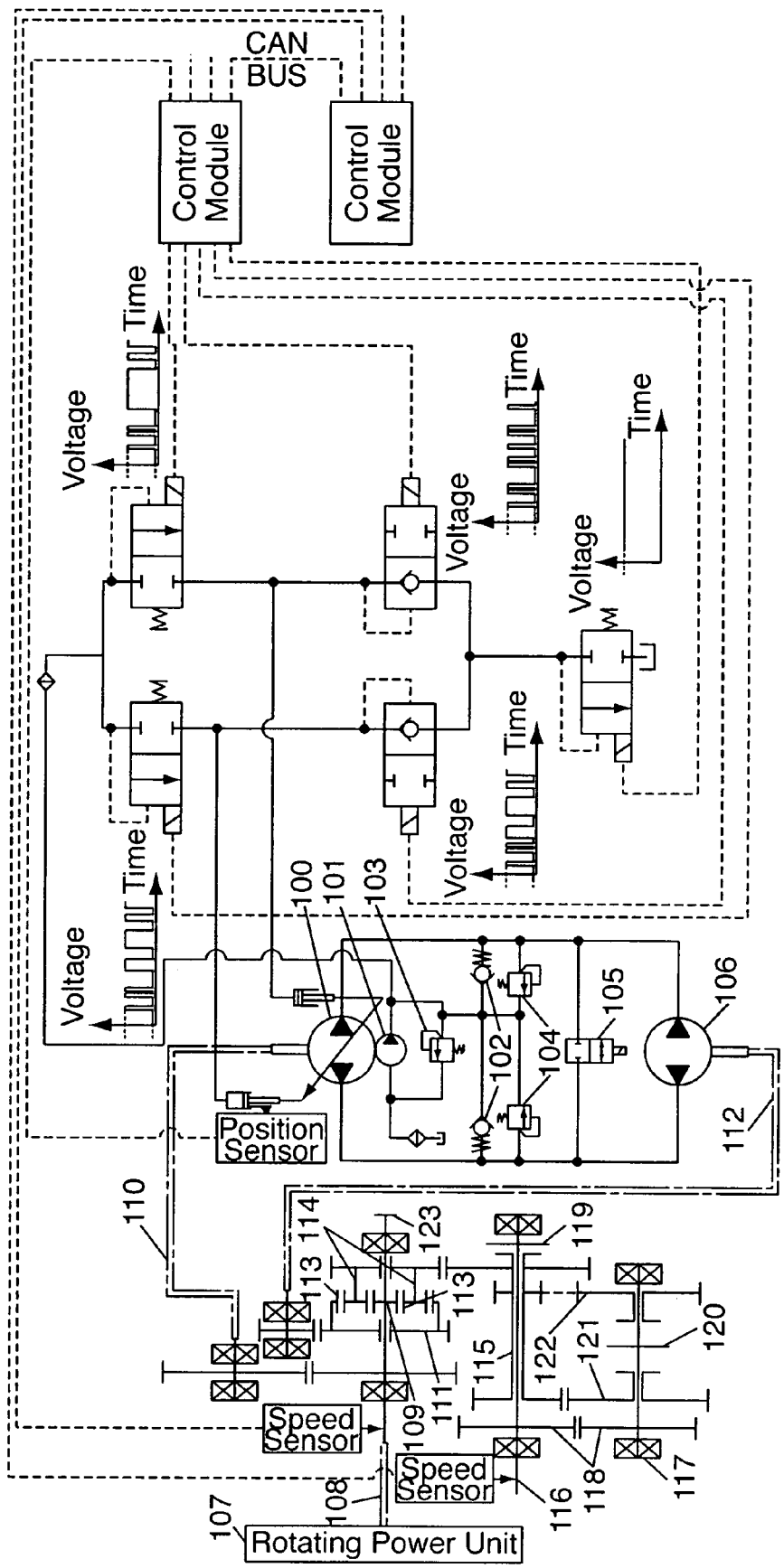
FIG. 7 is a schematic diagram illustrating use of a hydraulic actuator in a hydro-mechanical transmission (HMT).

FIG. 7 is a schematic diagram illustrating use of a hydraulic actuator in a hydro-mechanical transmission (HMT). The valve arrangement of the hydraulic actuator is identical to the one shown in FIG. 1, and it will therefore not be described here.

By metering flow into and out of the two chambers the displacement volume of a variable displacement unit 100 is varied. A charge pump 101 supplies the electro hydraulic actuator with fluid in addition to refilling two branches of the hydraulic main circuit through refill valves 102. A supply pressure relief valve 103 controls the pressure at the outlet of the charge pump 101. Pressure relief valves 104 protect the hydraulic main circuit against overpressure. By bypass valve 105 the two branches of the hydraulic main circuit may be partially or fully connected, thus bypassing a fixed displacement unit 106. For example, this gives the ability to rotate the fixed displacement unit 106 without the variable displacement unit 100 rotating, and visa versa. In the following description it is assumed that the bypass valve 105 is closed.

A rotating power unit 107, for example an internal combustion engine or an electrical motor, is driving an input shaft 108. The angular rotation speed of the input shaft 108 is the same as the angular rotation speed of sun gear 109, since they are connected. A gear drive from input 110 is connecting the input shaft 108 to the variable displacement unit 100. By varying the displacement volume of the variable displacement unit 100 the angular velocity of the fixed displacement unit 106 is varied. The fixed displacement unit 106 is connected to a ring gear 111 of an epicyclic gear train through gear drive to planetary gear 112. Consequently the angular velocity of the fixed displacement unit 106 and the angular velocity of the ring gear 111 are connected at a fixed ratio.

The relative angular velocities of the sun gear 109 and the ring gear 111 decide the angular velocities of the planet gears 113 and thus the angular velocity of the planet carrier 114. The planet carrier 114 drives a gear shaft 115 which is concentric with a first output shaft 116. The first output shaft 116 and a second output shaft 117 are linked through a first gear set 118 and their angular velocities are therefore at a fixed ratio. When all dog rings 119, 120 are disengaged the output shafts 116, 117 can rotate freely compared to the planet carrier 114. When engaging the first dog ring 119 with the gear shaft 115, the gear ratio from the planet carrier 114 to the output shafts 116, 117 is fixed at a first ratio. If engaging the first dog ring 119 with the bearing, the first output shaft 116 will be locked (vehicle park). If instead engaging the second dog ring 120 with a second gear set 121, the gear ratio from the planet carrier 114 to the output shafts 116, 117 is fixed at a second ratio. If instead engaging the second dog ring 120 with a third gear set 122, the gear ratio from the planet carrier 114 to the output shafts 116, 117 is fixed at a third ratio. In each of these gear ratios between the planet carrier 114 and the gear shaft 116, 117 infinitely many gear ratios between the input shaft 108 and the output shafts 116, 117 may be realized by controlling the angular velocity of the ring gear 111 through varying the displacement volume of the variable displacement unit 100. Hereby the gearing range is selected by operating either the first dog ring 119 or the second dog ring 120, while the specific gear ratio within the range is set by operating the variable displacement unit 100 using the electro hydraulic actuator. The specific displacement set-point for the variable displacement unit 100 is generated electronically in the control modules, in response to external sensor signals such as the two speed sensors, or any other sensor(s) connected to the control modules. As an alternative to the gear arrangement shown in FIG. 7, a gear arrangement of the kind disclosed in WO 2006/102906 could be used.

If the displacement volume of the variable displacement unit 100 is zero the ring gear 111 does not rotate, and the power flow is from the rotating power unit 107 to the output shafts 116, 117 through the mechanical gearing only. If the displacement volume of the variable displacement unit 100 is selected so the sun gear 109 and the ring gear 111 rotate in the same angular direction, the power flow going from the rotating power unit 107 to the output shafts 116, 117 is split between the mechanical gearing and the hydraulic main circuit. The fixed displacement unit 106 then works as a motor and the variable displacement unit 100 works as a pump. If the volume displacement of the variable displacement unit 100 is selected so the sun gear 109 and the ring gear 111 rotate in opposite angular directions, power is regenerated back to the input shaft 108 through the hydraulic main circuit. The fixed displacement unit 106 hereby works as a pump and the variable displacement unit 100 works as a motor.

An auxiliary pad 123 may be used as an additional power output, for example for mounting a hydraulic gear pump or mechanically driving a tool such as a snow blower, a snow blade, a plough, a tilt bucket, a herbicide sprayer etc.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A hydraulic circuit being connected to a fluid source and a fluid drain comprising:
    a variable displacement unit, fluidly arranged in a hydraulic main line, having a first chamber and a second chamber,
    a valve assembly arranged between the fluid source and the fluid drain, the valve assembly further being arranged to control fluid pressures in the first chamber and the second chamber such that the valve assembly controls flow in and out of the first and second chambers to vary a displacement volume of the variable displacement unit, and
    at least one auxiliary valve fluidly connected between the valve assembly and the fluid drain, said at least one auxiliary valve being of a kind which is normally closed in a de-energized state,
    wherein the valve assembly comprises at least four valves arranged in a bridge circuit with the variable displacement unit arranged in a diagonal of the bridge circuit.

2. The hydraulic circuit according to claim 1, wherein the at least one auxiliary valve is an electrically operable valve.

3. The hydraulic circuit according to claim 1, wherein the valve assembly comprises:
    at least one first valve fluidly connected between the fluid source and the first chamber,
    at least one second valve fluidly connected between the fluid source and the second chamber,
    at least one third valve fluidly connected between the first chamber and the at least one auxiliary valve, and
    at least one fourth valve fluidly connected between the second chamber and the at least one auxiliary valve.

4. The hydraulic circuit according to claim 1, wherein the valves of the valve assembly are controlled by means of a closed loop control.

5. The hydraulic circuit according to claim 4, further comprising at least one sensor, said sensor(s) being adapted to provide an input signal to the closed loop control.

6. Use of a hydraulic circuit according to claim 1 in a hydro-mechanical transmission (HMT).

7. A hydraulic circuit being connected to a fluid source and a fluid drain comprising:
    a variable displacement unit, fluidly arranged in a hydraulic main line, having a first chamber and a second chamber,
    a valve assembly arranged between the fluid source and the fluid drain, the valve assembly further being arranged to control fluid pressures in the first chamber and the second chamber such that the valve assembly controls flow in and out of the first and second chambers to vary a displacement volume of the variable displacement unit, and
    at least one auxiliary valve fluidly connected between the valve assembly and the fluid drain, said at least one auxiliary valve being of a kind which is normally closed in a de-energized state,
    wherein the at least one auxiliary valve is kept open during normal operation.

8. A hydraulic circuit being connected to a fluid source and a fluid drain comprising:
    a variable displacement unit, fluidly arranged in a hydraulic main line, having a first chamber and a second chamber,
    a valve assembly arranged between the fluid source and the fluid drain, the valve assembly further being arranged to control fluid pressures in the first chamber and the second chamber such that the valve assembly controls flow in and out of the first and second chambers to vary a displacement volume of the variable displacement unit, and
    at least one auxiliary valve fluidly connected between the valve assembly and the fluid drain, said at least one auxiliary valve being of a kind which is normally closed in a de-energized state,
    wherein at least one valve of the valve assembly is driven by a pulse train signal.

* * * * *